United States Patent [19]
Tsubusaki et al.

[11] Patent Number: 6,111,981
[45] Date of Patent: *Aug. 29, 2000

[54] METHOD AND APPARATUS FOR PROCESSING PATTERN IMAGE DATA BY SEM

[75] Inventors: Koji Tsubusaki, Yokkaichi; Hiroshi Motoki, Kawasaki; Fumio Komatsu, Fuchu, all of Japan

[73] Assignee: Kabushiki Kaisha Toshiba, Kawasaki, Japan

[ * ] Notice: This patent is subject to a terminal disclaimer.

[21] Appl. No.: 09/130,522

[22] Filed: Aug. 7, 1998

Related U.S. Application Data

[63] Continuation of application No. 08/379,962, Jan. 27, 1995, Pat. No. 5,887,080.

[30]  Foreign Application Priority Data

Jan. 28, 1994 [JP] Japan ......................................... 6-8711

[51] Int. Cl.$^7$ ................................................... G06K 9/00
[52] U.S. Cl. ........................... 382/172; 382/170; 382/210; 382/256; 382/270
[58] Field of Search .................................... 382/172, 170, 382/257, 256, 273, 144, 147, 168, 108, 181, 149, 264, 270, 292, 282, 40, 280; 348/86, 87, 125, 126; 356/237.1

[56] References Cited

U.S. PATENT DOCUMENTS

| | | |
|---|---|---|
| 4,847,786 | 7/1989 | Wang et al. .............................. 382/171 |
| 4,975,972 | 12/1990 | Bose et al. .............................. 382/172 |
| 5,265,200 | 11/1993 | Edgar ...................................... 382/168 |
| 5,278,921 | 1/1994 | Nakamura et al. ..................... 382/168 |
| 5,345,513 | 9/1994 | Takeda et al. .......................... 382/172 |
| 5,438,552 | 8/1995 | Audi et al. .............................. 382/195 |
| 5,479,535 | 12/1995 | Komatsu ................................. 382/199 |

*Primary Examiner*—Bhavesh Mehta
*Attorney, Agent, or Firm*—Oblon, Spivak, McClelland, Maier & Neustadt, P.C.

[57]  ABSTRACT

Analog image data a SEM are converted into digital data, and are processed by a spatial filtering processing, histogram processing, threshold value setting, three-valued image data processing, noise reduction and the like. Area of a pattern in the three-valued image data is calculated by a labelling and calculation processing, and a pattern is sequentially detected by comparing the area of the pattern with a reference area value. The comparison and detection of the same or similar patterns repeated in the SEM image are performed by using the area of the pattern, and are not performed by a shape of the pattern, thereby resulting a precise detection at high speed by using a microprocessor. Since it is possible to perform a pattern recognition from the area value even though the pattern does not have a characteristic, it is possible to precisely detect and recognize a pattern image in high speed.

4 Claims, 6 Drawing Sheets

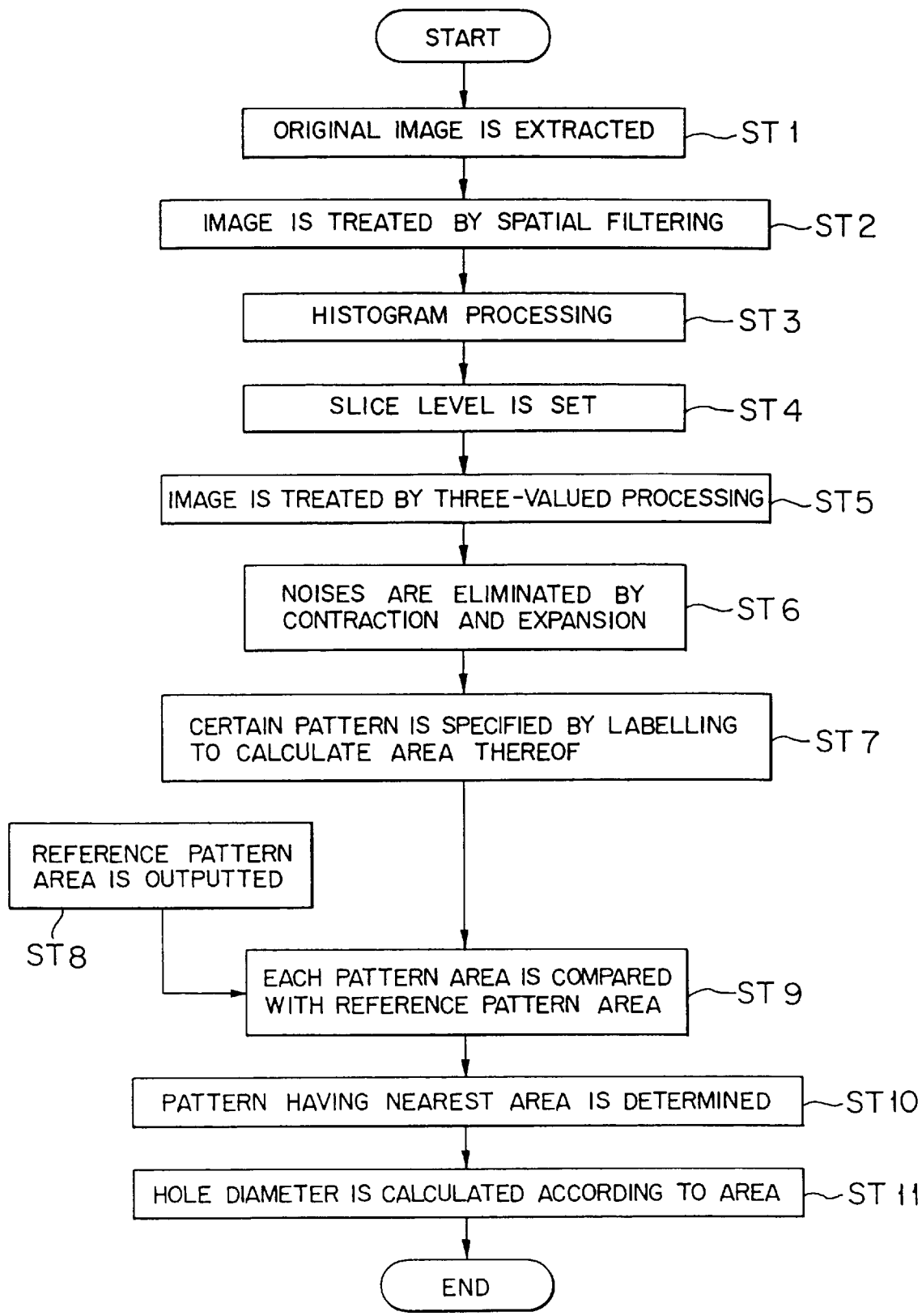
F I G. 2

25 26 27

METHOD AND APPARATUS FOR PROCESSING PATTERN IMAGE DATA BY SEM

This application is a Continuation of application Ser. No. 08/379,962, filed on Jan. 27, 1995, now U.S. Pat. No. 5,887,080.

BACKGROUND OF THE INVENTION

The present invention relates to a method and apparatus for a pattern image processing with respect to image data which have been imaged by a scanning electron microscope (SEM), and more specifically to a pattern image processing apparatus and image processing method which are used for detecting a specified hole pattern within pattern images in which successive hole patterns are repeated on a very large scale integration circuit (VLSI) element and for simultaneously obtaining a diameter of the specified hole pattern.

The above-mentioned scanning electron microscope (SEM) is used for inspecting a hole pattern such as a contact hole which is formed on the VLSI element. This is to perform an image processing with respect to microscope image data which are imaged by the SEM, thereby to compare and detect as to whether or not the formed hole pattern is a desired shape by using a pattern recognition method.

There is a general method by a template matching method as a pattern recognition method in which a similar function is estimated to search the local maximum value and the global maximum value. In particular, there is well known a method for detecting a position at which a correlative coefficient becomes the maximum value by means of a fast Fourier transform (FFT) algorithm when the similar coefficient is a linear shape. In this method, a reference image (template) is previously registered, and the reference image and an object image are performed by two-dimensional FFT processing, respectively. A convolution between FFT processing images is performed, and then the convoluted processing images are performed by two dimensional inverse FFT processing to obtain an inverse FFT processing image. A pattern recognition is performed by detecting a position having the maximum value from values of respective position coordinates, namely correlative coefficients of the inverse FFT processing image.

In the case where a pattern recognition is performed by using an FFT algorithm, what pattern should be detected from repetitive patterns in the VLSI element depends on the objective image at that time. The problems occur with the above-mentioned condition as follows:

(1) The objective image has a pattern repetitively arranged as the same shape as the reference image, and a detected pattern depends on a condition for taking into the objective image because the correlative coefficient (a local maximum value) with each pattern has an extremely near value;

(2) The pattern shape of the reference image does not necessarily have the sufficient features, thereby resulting in the case where a correlation failure occurs;

(3) In the cases where the objective image has the convolution component, where the objective image has changes of scaling caused by the manufacturing step, and where the SEM image has a distortion, the correlation failure occurs;

(4) Especially in an elliptic shape pattern, it is very rare for a revolution angle (for example, an angle formed by a beam scanning direction and a long diameter direction of the oval) of the images to coincide with between the reference image and the objective image, thereby reducing an accuracy of the pattern recognition because the local maximum value decreases; and (5) It is desired that a magnification of the image increases with a pattern finer because a size of the previously registered reference image has the optimum value by a shape and size of the pattern to be performed the pattern recognition However, since the changes of the magnification corresponding to the pattern are unsuitable for a manufacturing process level, there is a problem that it is impossible to use a general processor.

Even though there is proposed a normalized correlation method as a method for solving the above problem, there is a problem that the general processor can not be used because the method has a huge calculation amount and is unsuitable for a processing time of the manufacturing process level except when the processor specified for the calculation is introduced.

SUMMARY OF THE INVENTION

In view of the above-mentioned condition, an object of the present invention is to provide a pattern image processing apparatus and method in which a pattern is detected having an area nearest the objective image and a diameter of a hole pattern is simultaneously calculated from an area value in the case where there are patterns without having the sufficient features (for example, a circle shaped hole pattern); a convolution component of the objective image; changes of scaling in the pattern; and a distortion of the SEM image in an arrangement of a repetitive pattern.

In order to achieve the above object, a pattern image processing apparatus according to the present invention comprises analog-digital conversion means for converting analog image data having repeated patterns obtained by a scanning electron microscope (SEM) into digital image data; spatial filtering means for processing a spatial filtering to the digital image data by using a predetermined filter coefficient to obtain smoothed spatial filtering spatial data; histogram processing means for processing a classification of a plurality of pixels constituting the spatial filtering image data corresponding to a gray level of the pixels; threshold setting means for setting as a threshold level a slice level of a gray level value which is automatically detected in accordance with a discrimination reference method by using a histogram of the image data classified by the histogram processing means for separating classes of the histogram; three-valued (trinary) processing means for obtaining image data of three gray level regions including an intermediate portion, a white portion and a black portion after three-valued processing with respect to the image data by using the slice level as the threshold value which is set by the threshold value setting means; noise reduction means for decreasing noises and pseudo-patterns included in the three-valued image data processed by the three-valued processing means; pattern area calculation means for selecting by labelling processing each of patterns shown by a predetermined density in the repetitive pattern included in the three-valued image data in which the noises and pseudo-patterns are reduced by the noise reduction means to calculate an area value of each pattern selected; reference image storage means for storing an area of the reference image of one pattern constituting the repeated pattern as a detection object as the reference area value; and pattern comparison and detection means for comparing the area value of each pattern obtained by the pattern area calculation means with the reference area value stored in the reference image storage means and for detecting a pattern having an area value nearest one from a plurality of pattern.

Furthermore, a pattern image processing method according to the present invention, which is used in the pattern. image processing apparatus, comprises a step of inputting multi-valued image data into an image processing apparatus, a step of processing a spatial filtering with the image data, a step of performing a histogram with an image after the spatial filtering, a step of automatically setting a slice level with histogram data by a discrimination reference method, a step of performing a three-valued processing with respect to a spatial filtering processed image on the basis of the slice level, a step of alternately contracting and expanding with respect to the three-valued processed image, a step of performing a labelling processing with respect to the image data, and a step for obtaining an area of the repetitive pattern from the step of labelling and of detecting a pattern having an area nearest the area of the reference image which is previously registered.

The spatial filtering processing and the histogram processing are performed with respect to the input image. The slice level is obtained for the three-valued processing on the basis of the histogram data. The slice level can be obtained by detecting the minimum value of the histogram. Each level of the three-valued value corresponds to a pattern surface portion, a pattern taper portion, and a pattern bottom portion.

Since the contraction and expansion are performed with respect to the three-valued processed images, it is possible to reduce noises on the pattern edge portion and random noises which have not been reduced by the spatial filtering processing.

After the contraction and expansion processing, a labelling and an area calculation are performed with respect to the repetitive patterns, respectively.

The data having an area value nearest the area value of the reference image previously registered are detected from the labelling data.

As described above, it is possible to easily and rapidly specify and recognize each pattern in the repetitive patterns as a recognition object.

Accordingly, the present invention can eliminate the above-mentioned problems because a pattern recognition is performed by the area value, even though a pattern without the characteristics is selected as the reference image and even though both of the reference image and objective image have the convolution component. Furthermore, since a pattern recognition can be performed except a large dependency on the magnification and a diameter can be measured at the same time of the pattern recognition, it is possible to provide an extremely effective image processing apparatus.

BRIEF DESCRIPTION OF THE DRAWINGS

In the accompanying drawings:

FIG. 2 is a flow-chart showing an image processing method as an aspect of the present invention of operation of a pattern image processing apparatus according to the present invention;

DETAILED DESCRIPTION OF THE PREFERRED EMBODIMENTS

There will be described in detail a pattern image processing apparatus and method according to preferred embodiments of the present invention in reference with the attached drawings.

Figure 1:
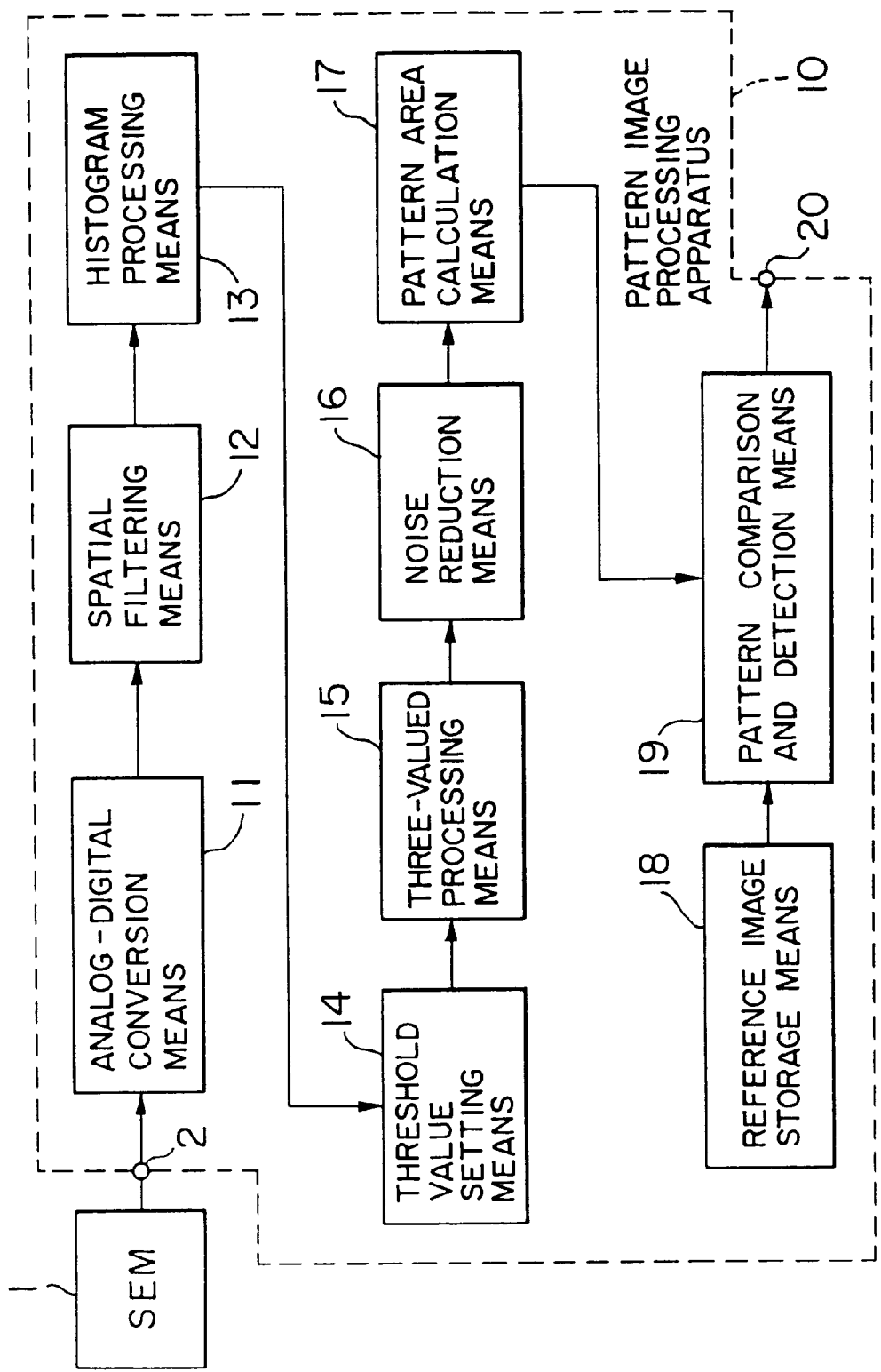
FIG. 1 is a block diagram showing a pattern image processing apparatus according to an embodiment of the present invention.

FIG. 1 is a block diagram showing an outline of the pattern image processing apparatus according to an embodiment of the present invention. In FIG. 1, numeral 1 denotes a scanning electron microscope (hereafter, abbreviated as SEM), and analog image data by the SEM 1 are supplied to an input terminal 2 of a pattern image proessing apparatus 10.

The pattern image processing apparatus 10 comprises analog-digital conversion means 11 for converting analog image data supplied from the SEM 1 through the input terminal 2 into digital image data including a plurality of pixels arranged in a matrix, spatial filtering means 12 for smoothing the digital image data, histogram processing means 13 for totaling the predetermined number of the pixels of the image data smoothed as a histogram corresponding to a gray level degree, threshold value setting means 14 for detecting two portions at which a pixel number of the histogram decreases and for setting a gray level value of these portions as a threshold value (slice level); three-valued processing means 15 for classifying three gray level degrees of an intermediate portion, a white portion and black portion corresponding to a pattern surface portion, a pattern taper portion and pattern bottom portion of a repetitive pattern such as contact holes which are successively arranged, noise reduction means 16 for reducing noises from the entire image by magnifying black noises on a white background and by reducing white noises on a black background with respect to three-valued image data, pattern area calculation means 17 for specifying a position of patterns for adding a labelling processing to each pattern in the repetitive patterns and for calculating an area of the specified pattern, reference image storage means 18 for storing as a reference image an optimum value with respect to an area of each pattern, and pattern comparison and detection means 19 for sequentially comparing a respective area value calculated from each pattern with the area value of the reference image and for detecting a pattern having the most approximate area value. The detected data with respect to the most approximate area value are outputted through an output terminal 20 to an external element of the pattern image processing apparatus 10.

Next, there is described an operation of the pattern image processing apparatus shown in FIG. 1 with reference to FIGS. 2 through 8. This operation corresponds to a pattern image processing method as another aspect of the present invention.

The followings are descriptions in accordance with a processing flow in a flow-chart shown in FIG. 2.

A SEM image extracted as an original image (in step ST1) is supplied through the input terminal 2 into the image processing apparatus 10 as a multi-valued image (for example, 8 bits gradation). The image is a rough and coarse one as shown by a chart in FIG. 4.

Figure 5:
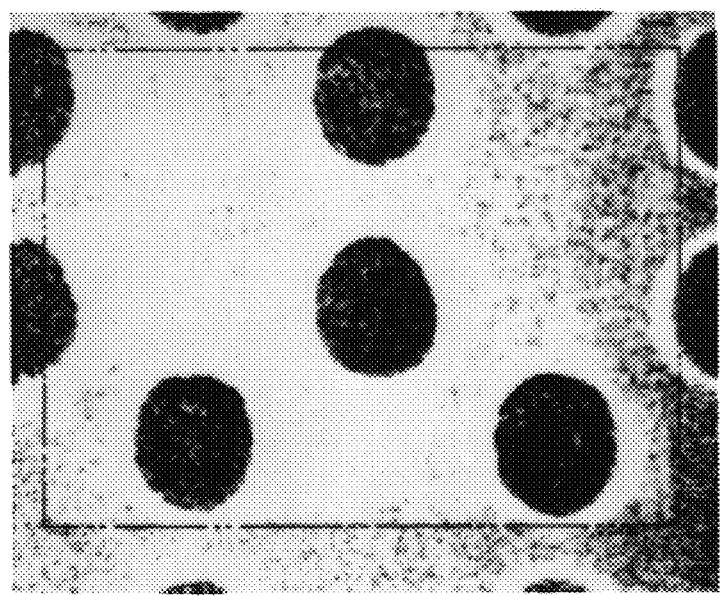
FIG. 5 is an explanatory view showing an image after contraction and expansion processing.

The input image is treated by a spatial filtering as a smoothing processing for the image (step ST2). A filtering matrix at this step adopts a filter coefficient of "3×3". The filter coefficient value may be obtained from the relationship of a beam diameter of the SEM and a pixel (picture element) size of the image. For example, when the beam diameter is 10 nm and the pixel size is 10 nm, a filter coefficient (111 121 111) may be adopted. The image which has been processed by the spatial filtering is a smoother one as shown in FIG. 5.

Figure 3:
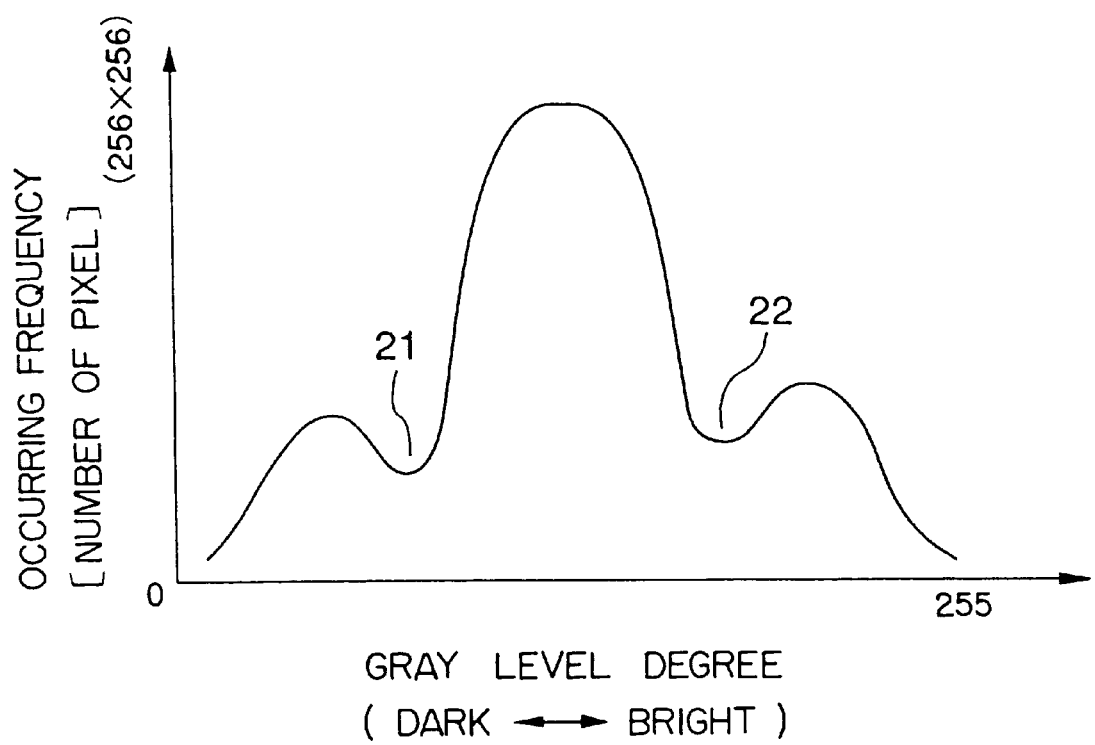
FIG. 3 is a histogram for explaining a histogram processing.

Next, there is performed a histogram processing (step ST3). The histogram processing is graphed with image data of "256×256" of 8 bits gradation by a gray level degree, for example as shown in FIG. 3. If the contact hole pattern of the VLSI element is shown as a histogram, it is possible to find two fallen-in portions 21 and 22 shown in FIG. 3. Next, the minimum value is obtained from the fallen-in portions 21 and 22 in the histogram data shown in FIG. 3. The minimum value is used for the slice level of the three-valued processing (step ST4).

Figure 6:
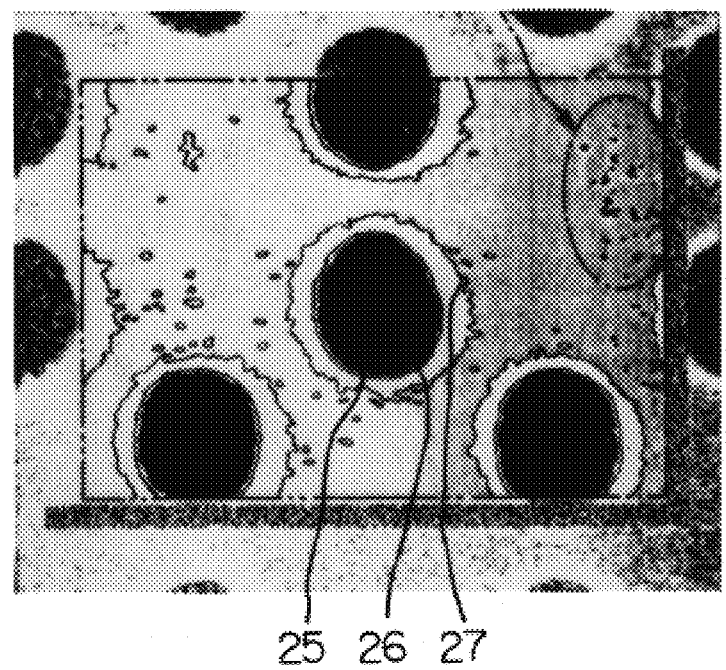
FIG. 6 is an explanatory view showing an image after three-valued processing.

The above-obtained threshold value (slice level) is provided for the three-valued image processing (step ST5). Accordingly, the SEM-image displayed by the multi-value is divided into the pattern surface portion, pattern taper portion and pattern bottom portion by the three-valued image processing. The pattern surface portion is represented by a gray level, the pattern taper portion is represented by a bright contrast, and the pattern bottom portion is represented by a dark contrast. As shown in FIG. 6, the image has noises 26 and 27 which are a saw-toothed shape around a contact hole 25, and noise 28 which is a black points shape by a shade portion at photographing the image on the intermediate portion.

Figure 7:
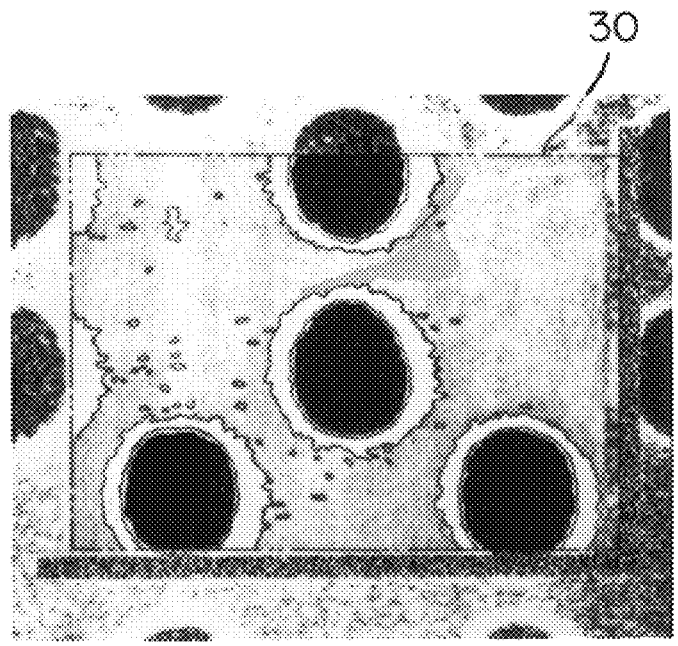
FIG. 7 is an explanatory view showing an image after contraction and expansion processing.

The noises in the three-valued image are reduced by alternative contraction and expansion (step ST6). The processing is performed in order to reduce the noises 26 and 27 having a saw-toothed shape on an edge of the pattern because the smoothing processing is insufficient in the spatial filtering processing, and to eliminate a fine pseudo image occurring at a three-valued processing caused by random noises. For example, an expansion for the white data can reduce the noise 28 which is a fine pseudo black pattern occurring in the white background. In the same manner, an expansion (contraction) processing can reduce the noises 26 and 27 which are fine black (or white) projections occurring on the white (black) edge portion. The image without noises shows a clear image condition in the same gradational portion as shown in FIG. 7.

The noise reduction is extremely effective by investigating entire eight pixels adjacent to the image to which is paid attention when the noises are reduced by a contraction and expansion.

Next, there are labelling and area calculation processing with respect to each of the patterns (step ST7). The noise reduction by the above contraction and expansion is important for executing the labelling processing within the minimum time. When the area value of each pattern is obtained by the labelling processing, a pattern having the area value nearest that of the reference pattern is detected from the registered reference image patterns.

Figure 8:
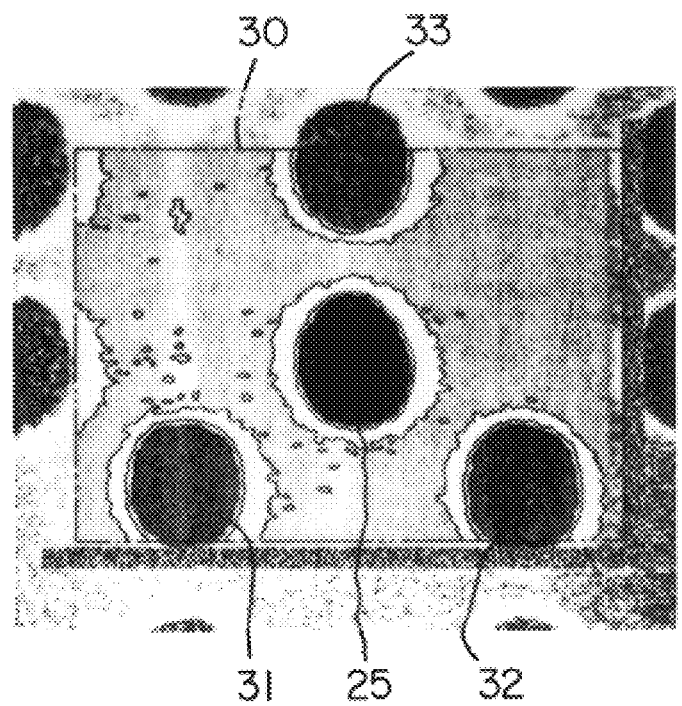
FIG. 8 is an explanatory view showing an image after a labelling processing.

Since the gist of the present invention resides in an operation in which the pattern area calculation is added to the labelling processing, this will be further described in more detail. The image to be an object for the area calculation is shown in FIG. 8, in which a predetermined range 30 is set and a specified pattern detection is performed with respect to respective patterns 25, 31, 32 and 33 included in the set range 30 (step ST7). When the area value of the patterns 25 and 31 through 33 within the area calculation range 30 shown by the dotted line is compared with the reference area value (step ST8) from the reference image storage means 18 (step ST9), since only the pattern 25 can be detected in the hole patterns in the case of the concrete example shown in FIG. 8, the pattern 25 is detected as the manner of having the highest coincidence with the reference area value (step ST10). If the comparison and detection are performed by moving a photographing range of the SEM 1 to result the movement of the area calculation range 30 step by step, it is possible to provide detection operation despite of the range.

Next, a diameter of the hole pattern is calculated from the area value (step ST11). When the hole pattern has an elliptic shape, it is possible to calculate the major axis and minor axis of the elliptic pattern on the basis of area and perimeter, which is obtained by tracing an outline of the perimeter of a corresponding pattern.

According to the processing procedure mentioned above, a characteristic of the specified hole pattern can be extracted from the fine repetitive patterns existing on the VLSI element, and the diameter of the specified hole pattern also can be measured at the same time.

There are shown in FIGS. 4 through 8 images of each steps of the image processing according to the present invention.

Figure 4:
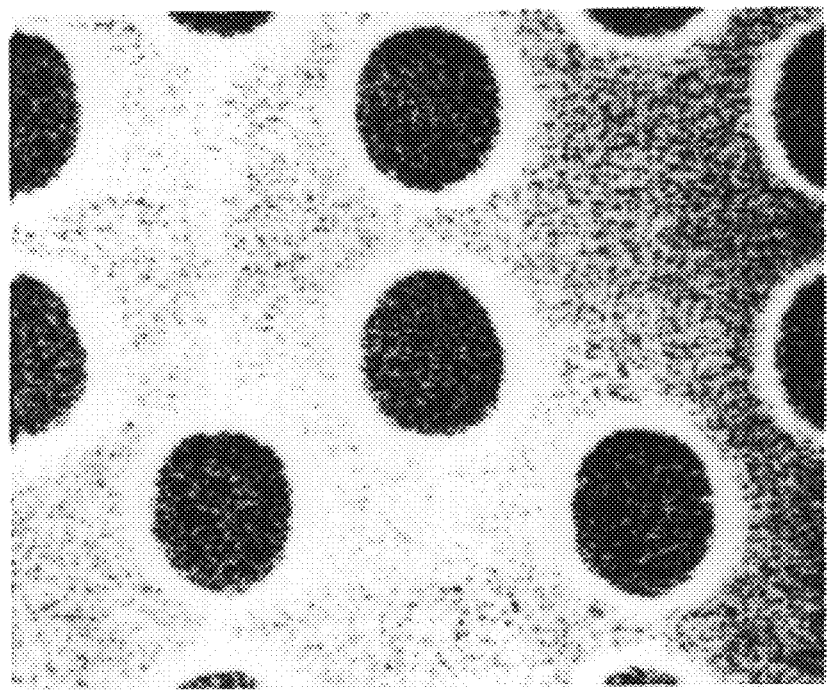
FIG. 4 is an explanatory view showing resist hole patterns in an original image of a magnification of 50K.

FIG. 4 shows an original image of a resist hole pattern which has a magnification of fifty thousands (50K). A frame addition is performed by sixteen times.

FIG. 5 shows a result that an original image is processed by a spatial filtering by using 3×3 matrix, and it is possible to obtain an improved effect by a smoothing processing as shown in FIG. 5.

FIG. 6 shows a result that a three-valued processing is performed by setting a slice level after a histogram processing, and it is understandable that a resist upper surface portion (a gray contrast), pattern Taper (a bright contrast) and hole bottom portion (a dark contrast) are respectively divided as shown in FIG. 6.

In FIG. 7 showing a result after contraction and expansion processing, it is understandable that noises of a pattern edge, a fine pseudo black pattern (a white portion) of the hole bottom portion, and a pseudo pattern (a black portion) of the resist upper surface are effectively reduced.

In FIG. 8 showing of a result a labelling and an area calculation, since the pattern at the center is nearest to an area value of the reference image pattern in this case, only a gray level value of a corresponding hole pattern is set to a zero (a dark contrast), and a gray level value of other hole pattern is set to the same level (a gray contrast) as the resist upper surface.

Since an area value of a corresponding is obtained by a labelling processing, it is possible to recognize the pattern and at the same time to calculate a diameter of a hole.

What is claimed is:

1. A method for processing an image in order to recognize a pattern of a scanning electron microscope (SEM) including a repetitive pattern, comprising:

a step of inputting multi-value image data such as contact holes which are made through a semiconductor substrate into an image processing apparatus;

a step of performing a spatial filtering with respect to said multi-valued image data of the contact holes to output a spatial filtering image for each of said contact holes;

a step of performing a histogram processing with respect to said spatial filtered image to output histogram data;

a step of automatically setting a slice level with respect to said histogram data;

a step of performing a three-valued processing with respect to said spatial filtered image on the basis of said slice level to output a three-valued processed image;

a step of alternatively performing a contraction and expansion with respect to said three-valued processed image;

a step of performing a labeling with respect to said image data; and a step of detecting an entire area of a pattern of contact holes having an area which most closely approximates an area of a reference image which has been previously stored, after obtaining said area of said repetitive pattern.

2. The method of processing image according to claim 1, further comprising:

a step of simultaneously calculating a diameter of the contact holes from an area of a hole pattern, which is obtained by said labelling processing.

3. A method for processing an image in order to recognize a pattern of at least one contact hole made through a semiconductor substrate by a scanning electron microscope (SEM) including a repetitive pattern, comprising:

a step of inputting multi-value image data of the at least one contact hole into an image processing apparatus;

a step of performing a spatial filtering with respect to said multi-valued image data of the at least one contact hole to output a spatial filtering image;

a step of performing a histogram processing with respect to said spatial filtered image to output histogram data;

a step of automatically setting a slice level with respect to said histogram data;

a step of performing a three-valued processing with respect to said spatial filtered image on the basis of said slice level to output a three-valued processed image;

a step of alternatively performing a contraction and expansion with respect to said three-valued processed image;

a step of performing a labeling with respect to said image data; and a step of detecting an entire area of a pattern of a contact hole having an area which most closely approximates an area of a reference image which has been previously stored, after obtaining said area of said repetitive pattern.

4. The method of processing an image according to claim 3, further comprising:

a step of simultaneously calculating a diameter of the at least one contact hole from an area of a hole pattern, which is obtained by said labeling processing.

* * * * *